Sept. 21, 1965            F. BAUR            3,207,243

BALANCE

Original Filed March 23, 1960            3 Sheets-Sheet 1

INVENTOR.
FRITZ BAUR
BY
Van Valkenburgh & Fields
ATTORNEYS

Sept. 21, 1965 F. BAUR 3,207,243
BALANCE
Original Filed March 23, 1960 3 Sheets-Sheet 2

INVENTOR.
FRITZ BAUR
BY
Van Valkenburgh & Fields
ATTORNEYS

Sept. 21, 1965   F. BAUR   3,207,243
BALANCE
Original Filed March 23, 1960   3 Sheets-Sheet 3

INVENTOR.
FRITZ BAUR
BY
Van Valkenburgh & Fields
ATTORNEYS

United States Patent Office 3,207,243
Patented Sept. 21, 1965

3,207,243
BALANCE
Fritz Baur, Denver, Colo., assignor to Wm. Ainsworth & Sons, Inc., Denver, Colo., a corporation of Colorado
Original application Mar. 23, 1960, Ser. No. 16,990, now Patent No. 3,150,730, dated Sept. 29, 1964. Divided and this application Mar. 31, 1964, Ser. No. 356,299
4 Claims. (Cl. 177—178)

This invention relates to precision analytical balances and more particularly to such balances in which the effect of tilting or vibration is compensated for or eliminated. This application is a division of my copending U.S. application, Serial No. 16,990, now U.S. Patent No. 3,150,730.

In modern precision analytical balances, it is necessary to be able to obtain the weight of an object being weighed to a certain number of decimal places, i.e., for analytical accuracy, the balance should indicate the weight of the object to tenths of milligrams, for semi micro accuracy to hundredths of milligrams and for micro accuracy, to thousandths of milligrams. The last two to four decimal places may be obtained by measuring or observing the inclination of the beam. Various balances may differ in the decimal places obtained by weights or riders, on the one hand, and by inclination of the beam, on the other hand, although the greater number of decimal places which can be indicated by inclination of the beam, the greater the rapidity with which the weighing operation can be carried out.

In the classical type of balance, two pans are suspended from opposite ends of a beam, the object to be weighed being placed in one pan and weights placed in the opposite pan, until the weight of the object is approximated. Then, depending upon the direction in which the beam swings, the fraction of the amount which the object is over or under the weight placed on the opposite pan is detected by measuring the inclination of the beam. For instance, the weights placed in the opposite balance pan may approximate the weight of the object to the nearest milligram and the tenths or hundredths of one milligram to be added to or subtracted from the total weight placed in the opposite pan may be measured through the inclination of the balance beam. One pan may be eliminated by placing the weights, in the form of riders, on the opposite side of the beam from the pan in which the object or article being weighed is placed. Or, a single pan for the object being weighed may be suspended from one end of the balance beam and a counterweight mounted on the opposite end of the balance beam, with weights, as in the form of riders, suspended from the beam at the same end as the pan and removed until the total weight of the riders removed approximates the weight of the object being weighed, in what is termed substitution weighing. Of course, the last two to four decimal places of the weight of the object are again indicated by the inclination of the beam.

In each case, the angular displacement of the beam is measured against a reference point, such as on the balance case, or on the base or column supporting the knife edge bearing for the beam. There are three general systems normally used to accomplish this. In one, more often used with the classical type of balance, a pointer is attached to the beam, in depending relation, while a scale is mounted in fixed position on the base of the column supporting the beam bearing, so that the lower end of the pointer will swing to one side or the other of the scale. In another system, a graticule and objective lens system are used, the graticule having a transparent plate, such as round and formed of glass on which a scale is printed, mounted on the beam. Light is focused on the graticule by an optical system which is mounted on the balance case, and the image of the graticule scale or indicia is transmitted by the optical system onto a screen, also mounted on the case and having fixed workings. When the beam tilts, due to a difference between the object being weighed and the compensating weights, the image of the graticule scale will appear at different positions on the screen. In a third system, an optical projection system is used, by which light passing through a slit, or transparent portion of a graticule corresponding to a slit, is reflected from a mirror mounted on the balance beam and appears as a spot of light on a scale which is mounted on the case, such as on one side thereof. In all of these systems, if the balance case is tilted, the reading will be in error in proportion to the amount of tilt. Tilting can be caused by a sagging table, warping of a wooden table top, sagging of a floor due to shifting of loads thereon, or even sagging of a building. Also, if the balance is moved around to different positions on a table whose top is not perfectly plane, it will have different degrees of tilt at different positions. Furthermore, a balance which is extremely sensitive to tilt cannot be mounted on a soft pad to insulate the balance for vibration, but must rest upon a solid surface. Thus, error in the reading of the weight of an object being weighed by such a balance may occur due to vibration, such as caused by traffic, nearby equipment, such as motor driven machines of various types, and others. However, if the effect of tilt could be eliminated, or compensated for, the balance could be mounted on a soft pad and thereby be insulated from vibration.

Since in each of the above systems, the relative movement of the beam with respect to the case is detected in order to obtain a more accurate reading, it will be evident that when the beam has reached equilibrium, it will remain at a fixed point in space, but if the balance case is tilted or is vibrated, the reading will not be the same. Normally, when tilted or when vibrated, the displacement or motion of the balance case may be quite complex, i.e., in three dimensions, although only the component in the plane of the beam and perpendicular to the center bearing line is of importance here, since the movement of the beam in this direction is that which is being detected for weighing purposes. Thus, the influence of tilting or vibration is occasioned by displacement or movement of the case, while the beam remains at a fixed point in space. The exception, in the case of vibration, is that if the vibration accidentally has the same frequency as the natural frequency of the beam, the beam may be excited into movement by resonance. However, even in modern "fast" balances, the beam period, i.e., one full swing, is on the order of 2 to 20 seconds, while most vibrations have a frequency of 10 to 100 cycles per second and thus are remote from the normal frequency of the usual beam.

Among the objects of this invention are to provide a novel precision balance; to provide such a balance in which the effect of tilting of the balance case is compensated for; to provide such a balance in which the effect of vibration is substantially eliminated; to provide such a balance in which the foregoing may be accomplished in an easy and facile manner; to provide such a balance in which the means for compensating for tilt of the balance case or eliminating the influence of vibration does not unduly complicate the structural arrangement; to provide such a balance in which a graticule and light projection system is utilized; and to provide means for compensating for tilt of the balance case and eliminating the influence of vibration, which may be applied to a complicated modern analytical balance.

Additional objects and the novel features of this invention will become apparent from the description which follows, taken in conjunction with the accompanying drawings, in which.

In general, a balance constructed in accordance with this invention, as well as the invention of my aforesaid copending application, Serial No. 16,990, now Patent No. 3,150,730 includes means which compensates for tilt of the balance case and which substantially eliminates the influence of vibration by providing a reference point for measurement purposes which will remain at a generally fixed point in space, irrespective of tilt or movement of the balance case in the direction of the component in the plane of the beam and perpendicular to the center bearing line of the beam. This reference point is most readily established by mounting a component of the indicating system for pivotal movement about an axis parallel to the center bearing line of the beam and maintaining this component in a relatively fixed position in space, as through a weight of sufficient size that it will remain in fixed position in space, similar to the action of a plumb bob which, when suspended by a string, always points toward the center of the earth. It will be noted that the term "fixed position in space" is used here relative to the earth and is not concerned with other celestial bodies. Such component may, in the case of a balance having a pointer attached to the beam and a scale, be the scale itself. In the balance system which uses a graticule mounted on the beam, the component may be the projection lens which focuses the indicating spot of light on the graticule. In the balance system which utilizes a mirror, this component may be one of the mirrors in the projection system by which the light from the beam mirror is reflected onto a scale mounted on the case. In some instances, one or more additional mirrors may be necessary to provide the desired light path.

Figure 1:
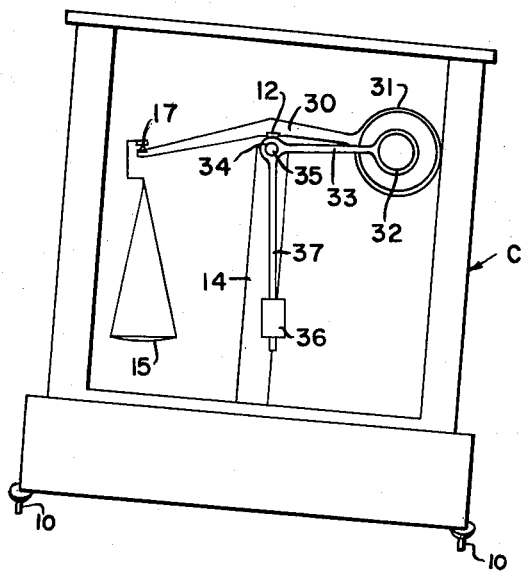
FIG. 1 is a front elevation, considerably simplified, of a balance constructed in accordance with this invention, with the case tilt exaggerated, employing a graticule and objective lens for fine measuring purposes.

As illustrated in FIG. 1, the principles of this invention are applied to a balance mounted in a case C, which is tilted to an exaggerated extent, the balance case being provided with the usual leveling screws 10 which are normally adjusted to obtain as accurate a level of the balance as possible. However, even though the leveling operation might not be accurate, the tilt of the balance will not affect the reading obtained. This balance includes a beam 30, from one side of which a pan 15 is suspended, as through a conventional knife edge bearing 17 and in which an object to be weighed is placed. The opposite side of beam 30 is provided with a graticule 31, on which a scale is printed and against which light is directed by a light system including a projection lens 32. Beam 30 is supported by a knife edge bearing 12, engaging a rest block mounted atop column 14, while weights to compensate for the weight of the object placed in pan 15 may be placed on or removed from the side of beam 30 opposite pan 15, by a conventional weight applying mechanism (not shown).

According to this invention, the projection lens 32 is not fixed to the case C, as is conventional, but is supported by an arm 33 extending from a collar 34, preferably containing a low friction ball bearing and mounted for pivotal movement on a pin 35 which extends horizontally and forwardly from the upper end of column 14. The projection lens 32 is maintained in a fixed position in space by a weight 36, mounted on the lower end of an arm 37, which depends from collar 34 and is conveniently perpendicular to arm 33. As will be evident, if balance case C is tilted or is vibrated, weight 36 will cause arm 37 always to assume a downward position, so that projection lens 32 will always remain at a fixed point in space and any movement of beam 30, due to tilting of the balance case, will be compensated for by a corresponding movement of weight 36 and projection lens 32, about pin 35 as the pivot point. As will also be evident, as shown in FIG. 1, the center of projection lens 32 coincides with the center of graticule 31, when no weight is placed on pan 15. However, if projection lens 32 were mounted in fixed position on case C, so as to be focused on the center of graticule 31 when beam 30 is horizontal, i.e., with case C not tilted, in the position of case C shown in FIG. 1, projection lens 32 would be focused on a point considerably below the center of graticule 31, the zero reading thus being in error in an amount corresponding to the tilt of the balance. Of course, when an object being weighed is placed on pan 15 and compensating weights are placed on beam 30 or on an arm connected thereto, the final reading will be in error by an amount equivalent to the error in the zero reading with the case tilted. In this connection, it will be noted that the light projection system, for projecting the image of the graticule scale or other indicia onto a screen mounted on case C, as at the left, will normally magnify any shift of the graticule, such as 50 times, so that any actual error in the position of the graticule will be similarly magnified. However, if the graticule shifts, as due to tilting, and the projection lens 32 moves with it, the image of the graticule will be shifted on the scale only the actual distance of movement, such as one fiftieth of the former. Thus, adjustment of the scale to compensate for tilt is not satisfactory.

As indicated above, the pivotal suspension for projection lens 32 and weight 36 may be any other suitable low friction bearing, such as a knife edge bearing, a flexible wire or strip suspension, or the like. The balance case C of FIG. 1 may also be provided with other conventional parts, such as damping devices for both the beam and for the weight 36, a light source for the projection lens 32, a device for lifting the knife edge bearing 12 off the rest block and centering the same, a suitable weight applying mechanism, and other conventional parts.

Figure 2:
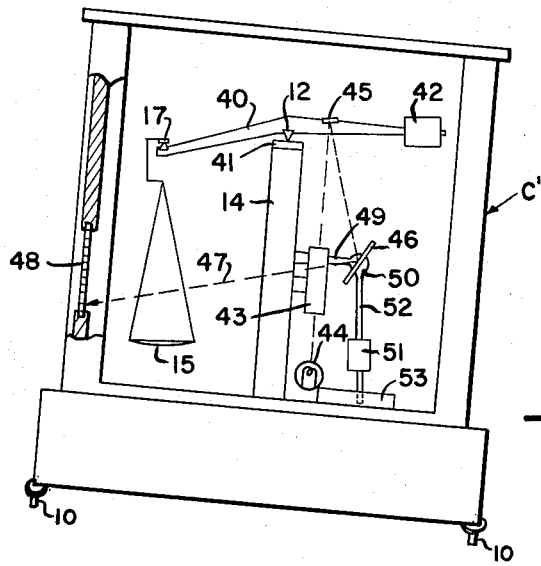
FIG. 2 is a front elevation, considerably simplified, of a balance constructed in accordance with the invention of my copending U.S. application, Serial No. 16,990, now Patent No. 3,150,730, with the case tilt exaggerated, employing a light projection system, a mirror mounted on the balance beam and a scale mounted on the balance case for fine measurement purposes.

The principles of this invention, as claimed in my copending application Serial No. 16,990, are also applied to the balance illustrated in FIG. 2, shown in a simplified manner, and mounted in a case C', the title of which is again exaggerated for purposes of illustration. This balance, which is particularly adapted to weigh very small objects or amounts of weight, includes a beam 40 supported by a knife edge bearing 12 engaging a rest block 41 atop column 14, with a pan 15 for receiving an object to be weighed being suspended from one side of the beam, as by a conventional knife edge bearing 17. The opposite side of beam 40 is provided with a counterweight 42, while weights (not shown) are mounted in a conventional manner on the same side of beam 40 as pan 15, the weighing thus being by substitution through removal of riders from the same side of the beam as the pan. A projection lens system 43 is mounted in upright position on column 14, so that a light beam produced by a light source including a lamp 44 will follow the path indicated by the dotted line between lamp 44 and a mirror 45 mounted on beam 40, which is reflected from mirror 45 to an angularly disposed mirror 46, for further reflection on a beam 47 onto a transparent scale 48 mounted on one side of case C', the graduations of scale 48 actually being across the outer or inner surface of scale 48 rather than perpendicular thereto, as in the position shown, which is for illustrative purposes. In the conventional construction of this type of balance, the mirror 46 would be mounted in fixed position, as on a bracket 49, but in accordance with this invention, the mirror 46 is mounted on a collar 50, conveniently provided with a ball bearing and engaging a pin extending horizontally from the end of bracket 49, while a weight 51 is suspended by an arm 52 extending downwardly from collar 50, the lower end of arm 50 conveniently extending downwardly into a damping liquid, such as oil, contained in a receptacle 53.

As shown in FIG. 2, the light beam 47 refected from mirror 46 impinges upon the lower end of scale 48, the zero position, indicating that there is no weight on pan 15. However, as will be evident, if mirror 46 were supported in fixed position from column 14, the light beam 47 would indicate a comparatively considerable weight in pan 15 and the zero reading would be in error in that amount. Also, if a weight were placed in pan 15, the weight indication thereof would be increased by the error due to the tilting of balance case C', when tilted in the direction shown, while if the balance case were tilted in the opposite direction, the reading would be decreased by an amount equivalent to the tilting of the balance. Thus, the reading would be greatly in error, which is a considerable disadvantage when objects or articles weighing only a fraction of a gram are being weighed.

As indicated previously, weight 51, which maintains mirror 46 in a fixed position in space, may be suspended in any other suitable manner by a low friction bearing, such as a knife edge bearing, a flexible wire strip, or the like. Also, the balance may be provided with additional conventional parts, such as a device for raising the beam and bearing off the rest stop, damping mechanism, and the like. The principles of this invention may, of course, similarly be applied to balances in which the weight indication is obtained by reflection of a light beam through mirrors onto a scale mounted on the balance case, but weights or riders are applied to the beam to approximate the weight of the object being weighed.

An additional advantage of the mirror and light beam system, such as utilized in the balance of FIG. 2, is that a horizontal displacement of the knife edge bearing 12, on the rest stop 41 atop column 14, does not adversely affect the reading, since it is the angularity of mirror 45 which produces the indication of the weight, of course with the mirror 46 compensating for tilt or vibration of the balance case. In each of FIGS. 1 and 2, it will be noted that neither the weight 36 of FIG. 1, nor the weight 51 of FIG. 2 unduly complicates the structure of the balance.

Figures 3, 4, 5:
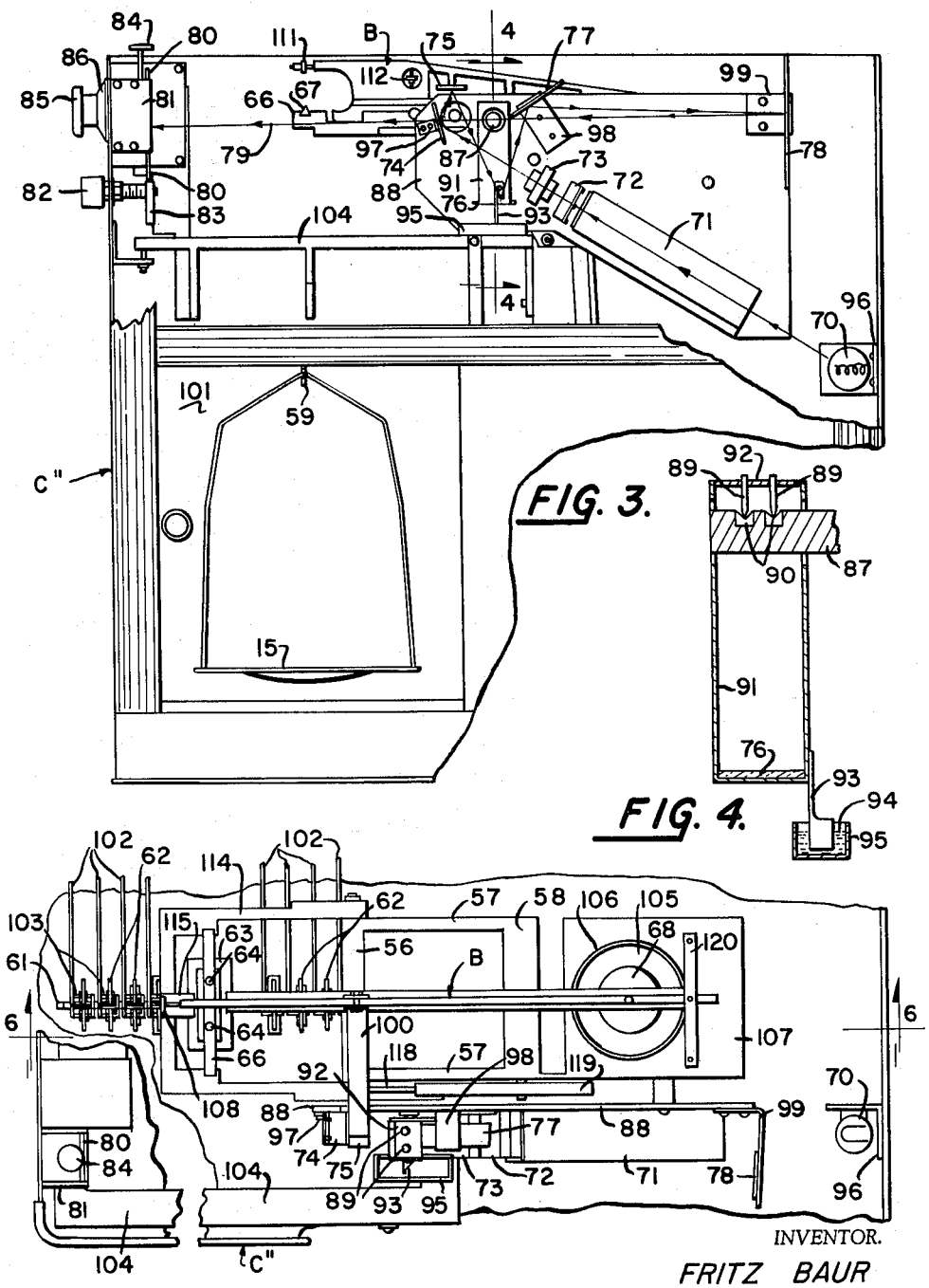
FIG. 3 is a front elevation, partly broken away to show the parts in the interior, of one type of modern analytical balance embodying the principles of the invention of my copending U.S. application, Serial No. 16,990, now Patent No. 3,150,730, and utiliizng a light projection system, a mirror mounted on the balance beam and a scale mounted on the balance case.
FIG. 4 is a fragmentary vertical section, on an enlarged scale, taken along line 4—4 of FIG. 3.
FIG. 5 is a fragmentary top plan view of the balance shown in FIG. 3 with the top cover removed.
Figure 6:
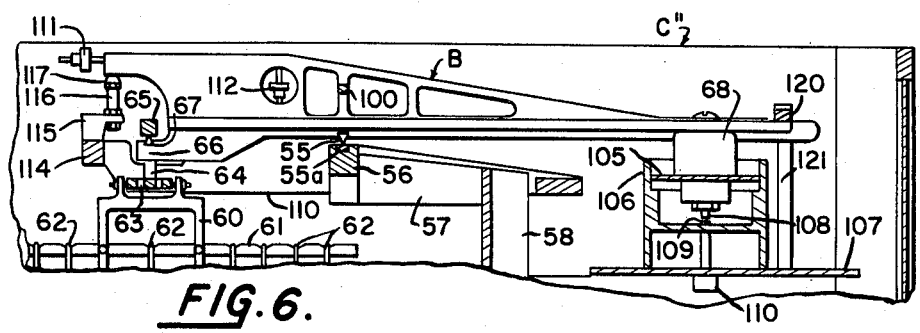
FIG. 6 is a fragmentary, vertical section taken along line 6—6 of FIG. 5.

The principles of this invention, as claimed in my copending application Serial No. 16,990, are also applied to the modern analytical balance shown in FIGS. 3 to 6, inclusive, which is a modification of the "Ainsworth Type S" balance. Such a balance includes a case C'' and a beam B, which is pivotally supported by a knife edge bearing 55 of FIG. 6 engaging a rest block 55a mounted on a cross bar 56 extending transversely between the ends of a pair of arms 57, in turn extending forwardly from each side of a column 58. An object to be weighed is placed in a pan 15 of FIG. 3, suspended from a hook 59 which is suspended from the lower bar of a rectangular weight rack 60 of FIG. 6 and which includes a horizontal weight bar 61. A series of weights are suspended by loops 62 from bar 61 and are removed during the weighing operation by a weight removal mechanism described later. The weight rack may also include an additional weight supporting bar, similar to bar 61 but disposed beneath bar 61. As also shown in FIG. 6, the weight rack 60 is connected by a jeweled gimbal 63 whcih permits pivotal movement in two directions in a horizontal plane so that the weights and the pan will always be extended vertically, to the lower ends of a pair of struts 64 which extend downwardly from a bearing block 65. Struts 64 are disposed on opposite sides of a flange 66 of beam B, while bearing block 65 engages a knife edge bearing 67 mounted on flange 66, as also shown in FIG. 3. It will be noted that the remainder of the weight and pan supporting structure are omitted from FIG. 3, for clarity of illustration. As in FIG. 6, a counterweight 68 is mounted on the underside of the opposite end of beam B, so that weights may be removed by lifting loops 62 from the weight bar 61, to compensate for the weight of an object placed in pan 15 of FIG. 3, the weighing thus being by substitution. After the requisite number of weights have been removed from the weight bars 61, the last three decimal places of the weight of the object is determined from an indication of the inclination of the balance beam B.

For measurement of the inclination of balance beam B, in accordance with this invention, as in FIGS. 3 and 5, a light source, such as a lamp 70, is mounted on one side of the case C'', the light produced by lamp 70, as indicated by the lines provided with arrows, being directed through a condensing lens 71, then through a graticule 72 and an objective lens 73, each of which is mounted in fixed position. As also indicated, the light is directed by objective lens 73 onto a fixed mirror 74 and thence reflected onto a mirror 75 mounted on beam B. From mirror 75, the light beam is reflected onto a mirror 76 which, in accordance with this invention, is maintained in a fixed position in space, thence reflected onto another fixed mirror 77 and to a reflecting mirror 78, which may be mounted in a suitable position, such as above lamp 70. From reflecting mirror 78, the final light beam 79 is directed onto a screen 80, mounted in a shadow box 81 to facilitate observation of the screen. The vertical position of screen 80 may be adjusted by a zero adjustment knob 82, through an eccentric 83, while a stop 84 is provided to limit upward movement of the screen. A weight removal knob 85, conveniently provided with a dial 86 by which the amount of weight removed may be indicated directly, is located on the same side of the balance case.

As in FIGS. 3 and 4, mirror 76 is pivotally supported from a supporting pin 87 extending horizontally from an upright bracket plate 88. As in previous forms, a ball bearing may surround supporting pin 87, or mirror 76 may be pivotally supported by means of a pair of pivot pins 89, the lower pointed ends of which are received in jewel bearings 90 mounted in supporting pin 87. Mirror 76 is mounted on the base of a U-shaped bracket 91, each side of which is provided with a hole through which supporting pin 87 extends, while pins 89 extend downwardly from a top bar 92, which extends between and is attached to the upper ends of the sides of U-bracket 91. As also shown in FIG. 5, a damping blade 93 may be attached to one side of bracket 91, in depending relation, so as to engage a damping liquid 94 of FIG. 4, disposed in a receptacle 95, to dampen any tendency for oscillation of mirror 76 and its supporting bracket 91. Due to the weight of the mirror 76 and the length of U-bracket 91, sufficient weight will normally be provided, remote from supporting pin 87, that mirror 76 will maintain a fixed position in space. However, if desired, an additional weight may be added to the underside of the base of U-bracket 91. As will be evident, in the event that the case C'' is tilted, the beam B will still remain at a fixed point in space, when at rest, while mirror 76 will pivot about supporting pin 87 to exactly the same degree as the balance case is tilted, thus establishing a reference point, at a fixed point in space, for reflection of the light beam from beam mirror 76 and to mirror 78. Thus, the tilt of the balance case will not affect the fine reading, or indication to the last two to four decimal places, of the weight of the object placed in pan 15.

The lamp 70 is conveniently mounted on one side of the balance case, as by a bracket 96, while the condensing lens 71, graticule lens 72 and objective lens 73 are conveniently mounted on the bracket plate 88. Also, the fixed mirror 74 may be mounted on the bracket plate 88, as by a bracket 97, and similarly the fixed mirror 77 by an angle 98 and the reflecting mirror 78 by an angle 99. It will be noted that the mirror 77 can be made relatively long, but sufficiently narrow that it will extend between the sides of the U-bracket 91, which supports mirror 76, so that the pivotal mounting of mirror 76 and the optical system does not interfere with the normal construction of the balance. Mirror 75 may be supported from beam B by a laterally extending arm 100, on the outer end of which the mirror is mounted.

In addition to the parts described above, the balance may include additional parts, such as a sliding glass door 101 of FIG. 3, which provides access to the pan 15. As illustrated in FIGS. 5 and 6, the weight removal mechanism may include levers 102 provided with stirrups 103 for engaging loops 62, to remove selected weights from weight bars 61, while the weight removal mechanism may be supported by a rectangular platform 104. Counterweight 68 may be provided with a piston 105, which extends into an air dash pot cylinder 106 mounted on a platform 107 supported by column 58, and at the lower end with a button 108, adapted to engage a stop 109 to limit pivotal movement of beam B, the stop being adjustable by a knob 110. The beam B is provided with a zero adjustment nut 111 at the outer end above the weight bar and pan and also with a sensitivity adjustment nut 112, located closer to the knife edge 55, it being noted that the zero adjustment nut 110 is adjustable in a horizontal plane and the sensitivity adjustment nut 111 in a vertical plane. An arrestment mechanism, for moving the knife edge 55 off the rest block 56, includes a rectangular U-frame 114, the rear ends of the side legs of which are pivotally mounted on the outside of the outer ends of arms 57, and the front center of which is provided with an upwardly extending arm 115 on which is mounted a stop pin 116 having an adjustable head 117. One side leg of frame 114 has a rearward extension 118 for engagement by a lever 119, pivoted on one side of column 58 and movable by suitable conventional means to depress leg extension 118 and thereby cause stop pin 116 to engage the underside of the outer end of beam B, as in FIG. 6. The beam is preferably arrested when the balance is not in use and when the pan is being loaded or unloaded, and also when the heavier weights are being removed from or placed on the weight bars.

A bar 120 is also attached to the end of the beam, outwardly from counterweight 68, so that conical cups mounted on the underside of bar 120 will engage the pointed ends of pins 121, extending upwardly from the platform 107, to support the beam in arrested position and to move the beam back to proper position when the arrestment pin 116 is again lowered.

Figure 8:
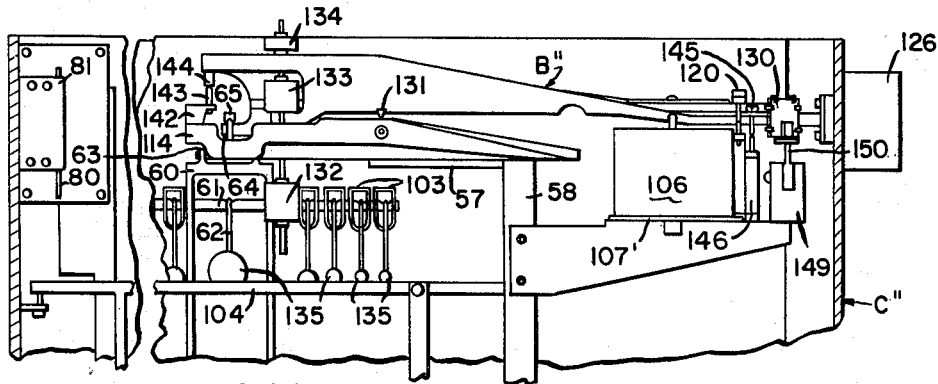
FIG. 8 is a fragmentary vertical section taken along line 8—8 of FIG. 7.
Figure 7:
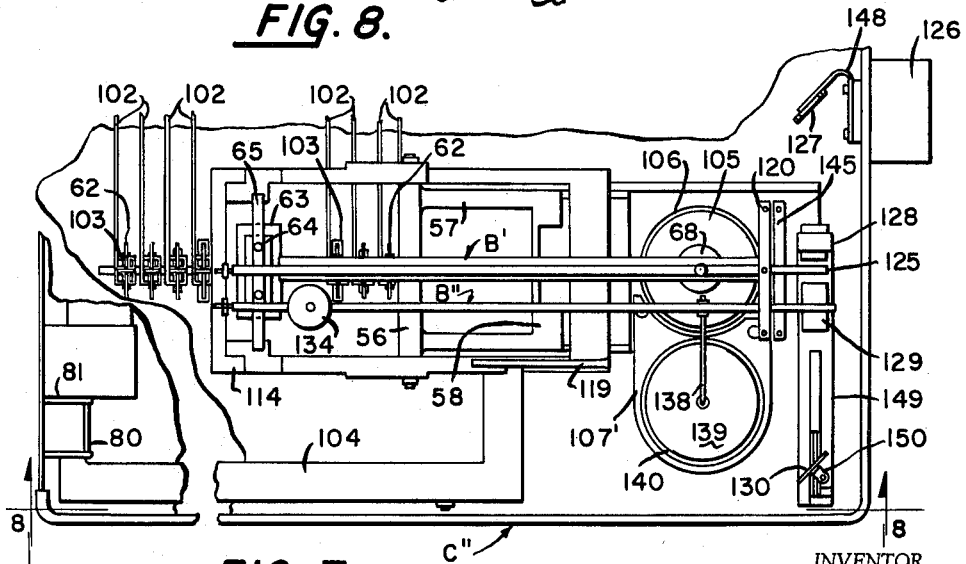
FIG. 7 is a top plan view similar to FIG. 5, but showing a modification of the balance which comprises the present invention.

The principles of the present invention are applied to the balance of FIGS. 7 and 8, which also is a modification of the "Ainsworth Type S" balance. The beam B' thereof is similar to beam B of FIG. 3, but is provided with a beam extension 125 in which is mounted a graticule through which light is projected from a lamp mounted in a housing 126, the light being reflected by a mirror 127 through a fixed condensing lens 128 onto the graticule in beam extension 125. Normally, an objective lens 129 would be mounted in fixed position, in substantially the same manner as condensing lens 128, and the image of the graticule would be directed against a mirror 130 and reflected onto a screen 80, mounted in a shadow box 81. As will be evident, in the event that the balance case C" is tilted, the position of the center of the graticule mounted in beam extension 125 would be shifted by an amount corresponding to the tilt, so that the indication obtained on screen 80 would be in error.

In accordance with the present invention, the objective lens 129 is not mounted in fixed position, but is mounted on the end of a compensating beam B" which is pivotal about a knife edge bearing 131, engaging a rest block on cross bar 56, in alignment with the knife edge for the beam B'. The beam B" is provided with adjustable compensating weights 132, 133 and 134, by which the position of beam B" may be adjusted so that the center of the objective lens 129 is in direct alignment with the center of the graticule mounted in extension 125 of beam B', when there is no article on the pan suspended from beam B' and all of weights 135 are in position on the weight rack bar 61. As will be evident, if the balance case should be tilted, when all of the weights are in position and there is no object on the pan suspended from beam B', the beam B' will be tilted in an amount corresponding to the tilt of the balance case. However, the compensating beam B" will also be tilted the same amount, so that objective lens 129 will focus the center of the graticule at a position such that screen 80 can be adjusted to place the center of the graticule at the zero position on the scale. Then, when the object to be weighed is placed on the pan supported by beam B', the inclination of balance beam B' resulting therefrom will, after appropriate weights have been removed, be indicated on the scale with reference to the objective lens 129, whose position has been shifted by the beam B" to correspond with the tilt of the balance case. Thus, the indication on scale 80, in comparison with the zero position previously determined, will be accurate, whereas if the objective lens 129 were fixed, the indication on the scale would be in error because of the angular deviation caused by the fact that the objective lens 129 would be fixed, rather than adjusted in position to correspond with the tilt of the balance case. However, when the objective lens 129 is shifted by beam B" to correspond to the tilt of the balance case, the angular deviation caused by a greater or lesser tilt of the beam B', due to the tilt of the balance case, will be compensated for. Thus, the compensating beam B" maintains the objective lens 129 in a fixed reference position in space.

The compensating beam B" may also be provided with a dash pot rod 138, attached thereto and extending laterally and then downwardly to a piston 139, movable in an air dash pot cylinder 140, mounted on a platform 107', which also supports the dash pot cylinder 106 for beam B'. The compensating beam B" is also adapted to be placed in arrested position by the arrestment mechanism which arrests balance B', as by an arm 142 mounted on the front of frame 114 and extending upwardly and inwardly to support a pin 143 adapted to engage a head 144 extending downwardly from the end of beam B". Beam B" may also be provided with a bar 145, extending transversely and provided with inverted conical cups for engagement with the conical upper ends of pins 146, mounted on platform 107', for centering the beam and supporting the rear end of the beam when the front end is raised by the arresting mechanism.

Lamp housing 126 is conveniently mounted on the outside of case C", while mirror 127 may be mounted on the inside of the case wall, as by a bracket 148. The fixed condenser lens 128 and mirror 130 are conveniently mounted on a supporting block 149, mirror 130 being mounted on a bracket 150 which is adjustable along the block 149 and also permits radial adjustment of the position of mirror 130.

The balance of FIGS. 7 and 8 may be otherwise constructed similarly to the balance of FIGS. 3 to 6, thus including a counterweight 68 attached to the underside of beam B' adjacent the rear end and provided with a piston 105 movable in an air dash pot cylinder 106. The arrestment frame 114 is similarly adapted to be actuated by a lever 119, while the beam B' is provided with a knife edge bearing on which rests the bearing block 65 from which struts 64 extend downwardly to the gimbal 63 for supporting the weight rack 60. Also, the weight removal and replacement mechanism may include levers 102 adapted to lift the weights 135 off the weight bar 61 by stirrups 103, which engage loops 62 from which weights 135 are suspended.

From the foregoing, it will be evident that a balance constructed in accordance with this invention fulfills to a marked degree the requirements and objects hereinbefore set forth. As will be evident, the provision of a reference point for measurement purposes which will remain at a generally fixed point in space, overcomes or compensates for the effects of vibration or tilting of the balance case. In addition, since the effect of tilt is compensated for, the balance case may be placed on a soft, resilient pad, to minimize the effect of vibration, and possible damage to the balance parts as a result thereof. As will be further evident, the principles of this invention are readily applied to different systems for indicating the inclination. Thus, the component which provides the fixed reference point in space may be the projection or objective lens when a graticule moves with the beam, as in the present invention, or a mirror in which a light beam is reflected from a mirror attached to the beam, as in the invention of my copending application Serial No. 16,990, now Patent No. 3,150,730. In each instance, such component does not unduly complicate the construction of the balance, i.e., the weight which maintains the component in such fixed position may be readily mounted, since the position of the weight may be varied, to take advantage of available space. Also, as in the case of a reflecting mirror, the mirror and the support for the mirror may provide sufficient weight.

As used herein, the term "graticule indicia" refers not only to a scale or other markings printed, embossed, engraved or otherwise produced on a transparent graticule, such as of glass, but also to a transparent portion of a graticule, the remainder of which is rendered non-transparent, which is also the equivalent of a slit or hole, or a plurality of slits or holes, in a plate or the like.

Although several different embodiments of this invention have been illustrated and described, it will be evident that other embodiments may exist and that various changes may be made therein, all without departing from the spirit and scope of this invention.

What is claimed is:
1. A balance including:
   a support;
   a beam movable from a central position in opposite directions about a horizontal pivot axis on said support and provided with means for supporting an object to be weighed;
   means for counterbalancing the weight of at least a portion of such object, said beam being disposed in a position in space determined by said object and said counter-balancing means;
   an optical system for indicating movement of said beam having at least one lens and a screen and including a graticule having indicia and being mounted on and movable with said beam for indicating movement of said beam; and
   means for maintaining a reference point in said optical system at a generally fixed point in space including a projection lens in said optical system, so that said optical system will indicate the movement of said beam with respect to said reference point independently of changes in position of said support, said reference point maintaining means comprising a second beam disposed parallel to and movable about a pivot point in substantial lateral alignment with the pivot point of said first beam, said projection lens being mounted on one end of said second beam in parallel relation to and in generally axial alignment with said graticule.

2. In a balance including a beam movable about a horizontal knife edge bearing and provided with means for supporting an object to be weighed from one end of said beam, means for counterbalancing the weight of at least a portion of such object, a graticule having indicia thereon and mounted on the opposite end of said beam, and a light system including a lens for producing and projecting an image of said indicia onto a screen, the improvement comprising:
   a support pin extending horizontally in parallel relation to and adjacent said beam knife edge bearing;
   a collar provided with a low friction bearing mounted on said support pin;
   a first arm extending laterally from said collar, said lens being mounted on the outer end of said first arm;
   a second arm extending downwardly from said collar; and
   a weight mounted on the lower end of said second arm for maintaining said second arm in a downward position and said lens at a relatively fixed point in space.

3. In a balance including a beam movable in opposite directions about a central, horizontal knife edge axis and provided with means for supporting an object to be weighed and for suspending a series of weights from one end of said beam, a counterweight at the opposite end of said beam, a graticule having indicia and mounted on said beam adjacent said counterweight, fixed means for projecting light through said graticule, and means including an objective lens for projecting the image of said graticule on a screen, the improvement comprising:
   a second beam movable in opposite directions about a horizontal knife edge axis in general alignment with the knife edge axis of said first beam, said second beam being parallel to said first beam and provided with counterweights at the end adjacent said first end of said first beam; and
   means for mounting said objective lens on the opposite end of said second beam.

4. In a balance as defined in claim 3, wherein an air dash pot is associated with at least one of said first and second beams.

References Cited by the Examiner

UNITED STATES PATENTS

| 831,164 | 9/06 | King | 177—190 |
| 1,567,224 | 12/25 | Baagoe | 177—178 |

FOREIGN PATENTS

| 163,980 | 9/49 | Austria. |
| 11,655 | 1892 | Great Britain. |
| 273,162 | 6/27 | Great Britain. |

LEO SMILOW, *Primary Examiner*.